United States Patent
Lection et al.

(10) Patent No.: US 9,009,849 B2
(45) Date of Patent: Apr. 14, 2015

(54) REGION-BASED SHARING OF PICTURES

(75) Inventors: David B. Lection, Raleigh, NC (US);
William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 13/472,207

(22) Filed: May 15, 2012

(65) Prior Publication Data

US 2013/0312113 A1    Nov. 21, 2013

(51) Int. Cl.
*G06F 21/00* (2013.01)
*G06Q 50/00* (2012.01)
*G06T 1/00* (2006.01)

(52) U.S. Cl.
CPC . *G06T 1/00* (2013.01); *G06Q 50/01* (2013.01)

(58) Field of Classification Search
USPC .......... 726/2, 26–28; 382/173, 180, 294, 305; 715/273
See application file for complete search history.

(56) References Cited

U.S. PATENT DOCUMENTS

| | | | |
|---|---|---|---|
| 6,720,997 B1 | 4/2004 | Horie et al. | |
| 7,777,784 B2 | 8/2010 | Bloom et al. | |
| 7,860,309 B1 | 12/2010 | Bodnar et al. | |
| 7,870,224 B1 | 1/2011 | Maigatter | |
| 7,925,714 B2 * | 4/2011 | Kamata | 709/217 |
| 8,031,940 B2 | 10/2011 | Vincent et al. | |
| 2003/0037111 A1 | 2/2003 | Yoshioka | |
| 2008/0084429 A1 | 4/2008 | Wissinger | |
| 2008/0189625 A1 | 8/2008 | Zuta et al. | |
| 2008/0294641 A1 | 11/2008 | Kim | |
| 2009/0199093 A1 | 8/2009 | Chakravarty | |
| 2010/0054601 A1 | 3/2010 | Anbalagan et al. | |
| 2010/0158374 A1 | 6/2010 | Anand et al. | |
| 2010/0251109 A1 | 9/2010 | Jin et al. | |
| 2012/0036228 A1 | 2/2012 | Ichinose et al. | |

OTHER PUBLICATIONS

International Search Report and Written Opinion of PCT/US13/40923. Nov. 14, 2013.
Babel, et al.; "Context-Based Scalable Coding and Representation of high Resoluiton Art Pictures for Remote Data Access", IEEE Inter. Conf. on, Jul. 2-5, 2007, pp. 460-463.
Zang, Dong-Qing; "Statistical Part-Based Models: Theory and Applications in Image Similarity, Object Detection and Region Labeling", Thesis, Columbia University, 2005.
Ip.Com et al.; "System and Method to Gray Out Images Within a Photo", IPCOM000201335D, Nov. 11, 2010.

* cited by examiner

*Primary Examiner* — Venkat Perungavoor
*Assistant Examiner* — Amir Mehrmanesh
(74) *Attorney, Agent, or Firm* — Cahn & Samuels, LLP

(57) ABSTRACT

An embodiment of the invention provides a method for sharing digital images on an image-sharing application, wherein a digital image is received from a user, the digital image including a first access setting defined by the user. A user-defined select region is identified on the digital image with a processor, wherein the select region includes a second access setting. Access to the digital image is permitted with an access controller based on the first access setting; and, access to the select region is permitted with the access controller based on the second access setting. In at least one embodiment, the digital image is displayed only to a first group of individuals based on the first access setting; and, the select region is displayed only to a second group of individuals based on the second access setting.

24 Claims, 6 Drawing Sheets

REGION-BASED SHARING OF PICTURES

BACKGROUND

The present invention is in the field of systems, methods, and computer program products for region-based sharing of pictures.

Due to the popularity of digital cameras, a dramatic increase of visual content such as photographs has been realized. The increased use of visual content has fostered new multimedia applications. For instance, FLICKR.COM, a photo sharing website, allows registered users to share their photos. PLUS.GOOGLE.COM and FACEBOOK.COM are other websites that allow users to upload a photograph that they want others to be able to view.

SUMMARY OF THE INVENTION

An embodiment of the invention provides a method for sharing digital images on an image-sharing application, wherein a digital image is received from a user, the digital image including a first access setting defined by the user. A user-defined select region is identified on the digital image with a processor, wherein the select region includes a second access setting. Access to the digital image is permitted with an access controller based on the first access setting; and, access to the select region is permitted with the access controller based on the second access setting. In at least one embodiment, the digital image is displayed only to a first group of individuals based on the first access setting; and, the select region is displayed only to a second group of individuals based on the second access setting. In another embodiment, the user-defined select region is smaller than the digital photograph; and, the second group of individuals is larger than the first group of individuals.

Another embodiment of the invention provides a method for sharing digital images on an image-sharing application, wherein a digital image and a first access setting are received from the user. The first access setting includes at least one of: individuals who are permitted to view the digital image, and individuals who are not permitted to view the digital image. A select region on the digital image and a second access setting are received from the user. The second access setting includes at least one of: individuals who are permitted to view the select region, and individuals who are not permitted to view the select region. Access to the digital image is permitted with an access controller based on the first access setting; and access to the select region is permitted with the access controller based on the second access setting.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention includes an efficient method of picture sharing that allows users to provide (e.g., upload) a single master photograph, define ranges upon that photograph, and designate the users and/or purposes for which that range can be used. In a preferred embodiment, a user will be enabled to upload a master picture (also referred to herein as an "image", "photograph", or "photo") to a file sharing website, social networking site, image hosting site, website, or other software application. The user is provided with an interface whereupon they are able to define various ranges of the photograph. For each region that is created on the master photograph, the user is able to assign different sharing or functional attributes.

In the following example, reference is made to FIGS. 1-4, which illustrate a user's photograph 100 showing different example ranges according to at least one embodiment of the invention. As used herein, the term "user" includes an entity of one or more individuals who subscribe to and maintain a profile on an image-sharing application. The user is connected to (e.g., is "friends" with) his priest, his brother, his friends from college, and his interior decorator on a social network.

Figure 1:
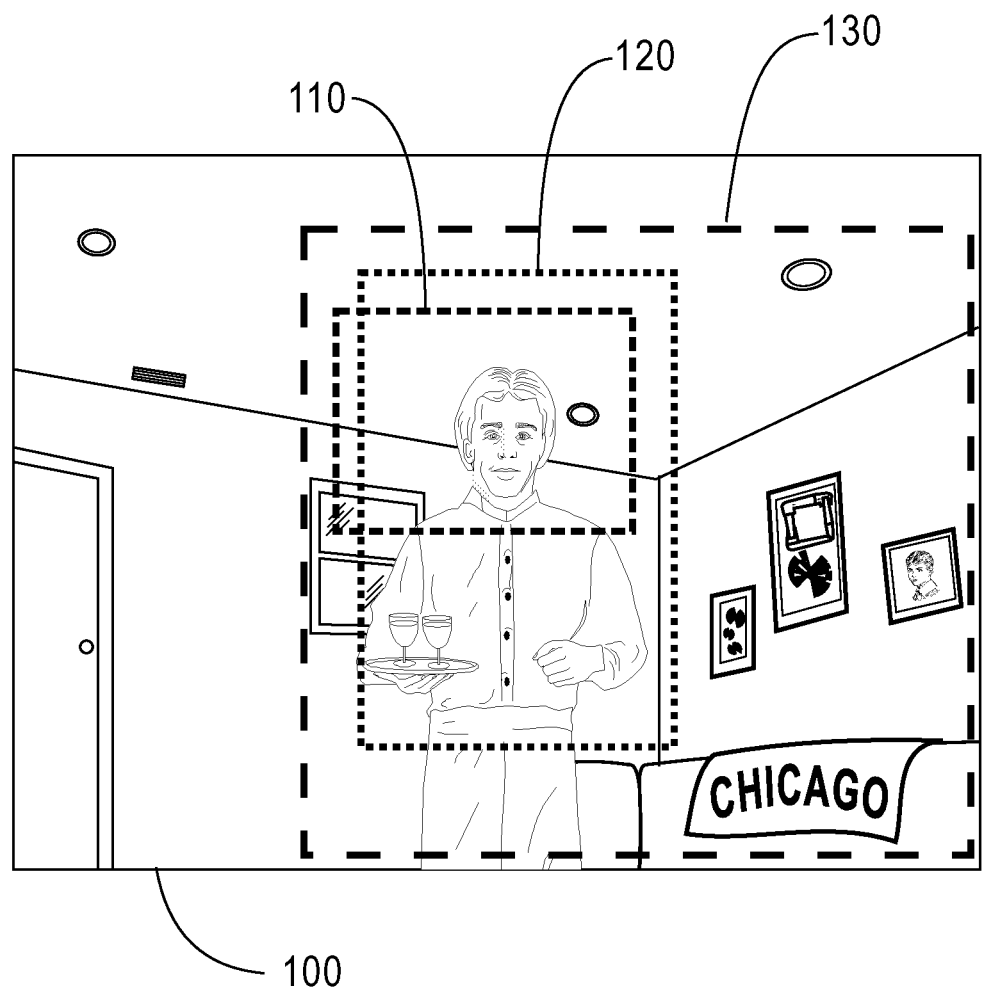
FIG. 1 illustrates a user's photograph according to an embodiment of the invention.
Figure 2:
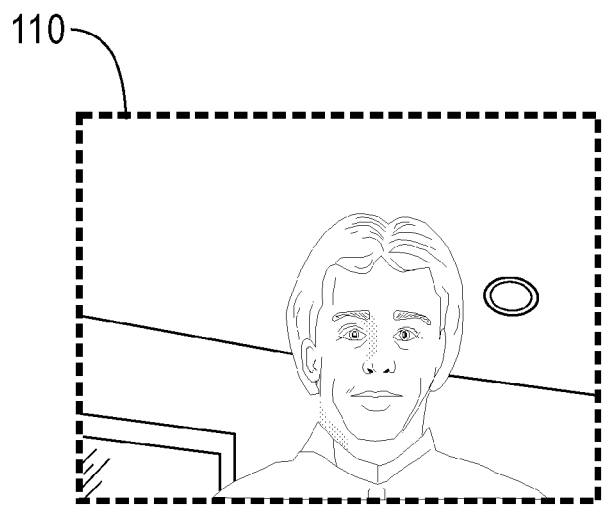
FIG. 2 illustrates a first region of the photograph illustrated in FIG. 1 according to an embodiment of the invention.

The user defines a first region 110 (also referred to herein as the "select region") as a headshot and assigns that region to be shared with his priest (FIG. 2). The user does this because he does not want his church community to know that he drinks alcohol, which is why the wine glasses are excluded from this region.

Figure 3:
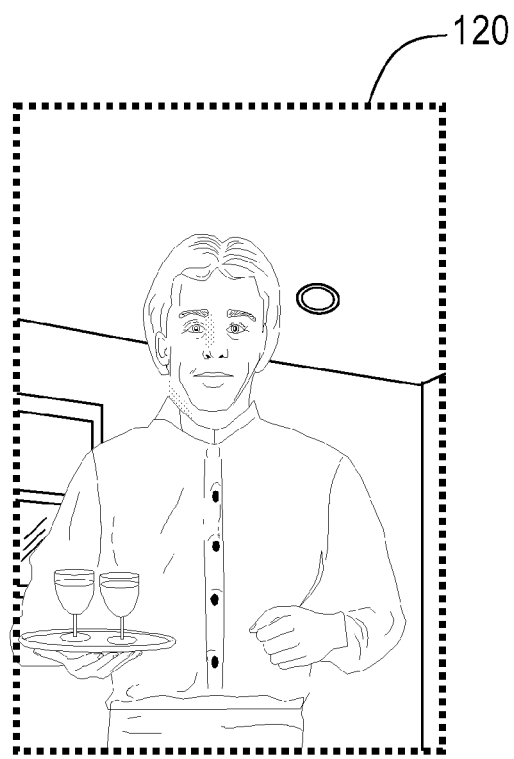
FIG. 3 illustrates a second region of the photograph illustrated in FIG. 1 according to an embodiment of the invention.
Figure 4:
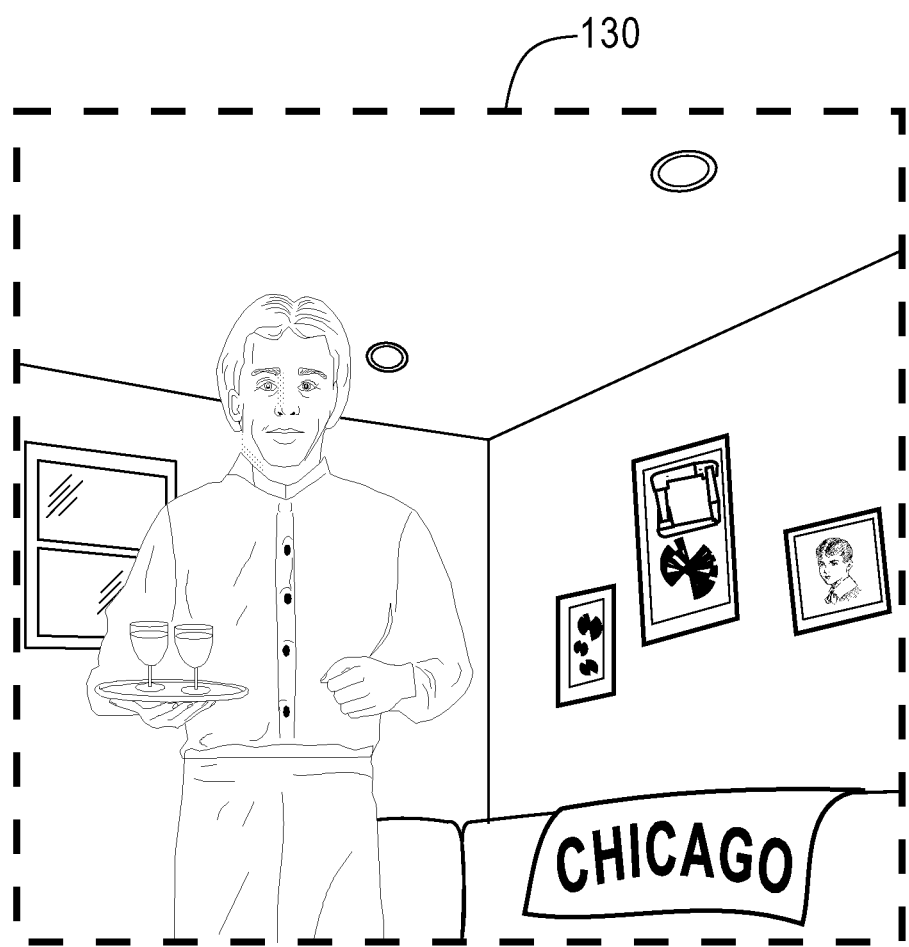
FIG. 4 illustrates a third region of the photograph illustrated in FIG. 1 according to an embodiment of the invention.

The user defines a second region 120 (also referred to herein as the "select region" or the "additional select region") as a full-torso picture and assigns that region to be shared with his brother (FIG. 3). The user does this because he doesn't want his brother to know that he was visiting friends in Chicago without him. Therefore, the CHICAGO blanket and any other attributes of the apartment, such as pictures hanging from the wall, that his brother might recognize as being a mutual friend's apartment in Chicago is excluded from the second region 120.

The user defines a third region 130 (also referred to herein as the "additional select region") to include himself, the "Chicago" blanket, and the wall pictures because he would like to share this picture with his college friends (FIG. 3) to remember their time hanging out in Chicago, but the entire photograph 100 is not relevant to that purpose.

The user shares the entire photograph 100 with his interior decorator, because he wants to know if he can get a similar room design for his house. Only the region(s) that the user has associated with his social network contact (or group of contacts) is shared. Specifically, only the first region 110 is shared with the user's priest; only the second region 120 is shared with the user's brother; and, only the third region 130 is shared with the user's college friends. The entire photograph 100, including the first region 110, second region 120, and third region 130, is shared with the user's interior decorator. In such an embodiment, the intersection of two regions is viewable to users assigned to either region.

In another embodiment, the intersection of two regions defines a new intersection region that has its own user sharing list, and is not necessarily shared with either of the two regions that define it. If a first region is shared with a user, but the intersection of the first region with a second region is not shared with said user, the non-shared intersection can appear blacked out or blurred.

In another embodiment, functions other than cropping are applied to the region, or the area outside of the region. For example, a region can define an area that is to be obscured to certain users. This can be accomplished by blurring of the region or placing a black bar over the region for those who lack sufficient access privileges. In another embodiment, the area outside of the region is blurred or blackened. As used herein, the terms "blackened" and "blocking" refers to a region or area outside of a region is filled with a solid color (e.g., black, blue, or white) such that the region or area outside of the region is not viewable. In another embodiment, the area outside the region is given a graphical filter, such as color balancing, sepia tone, brightness adjustment, or other common filters. In another embodiment, these filters are applied within the region. In another embodiment, filter regions and user-shared regions coexist.

Figure 5:
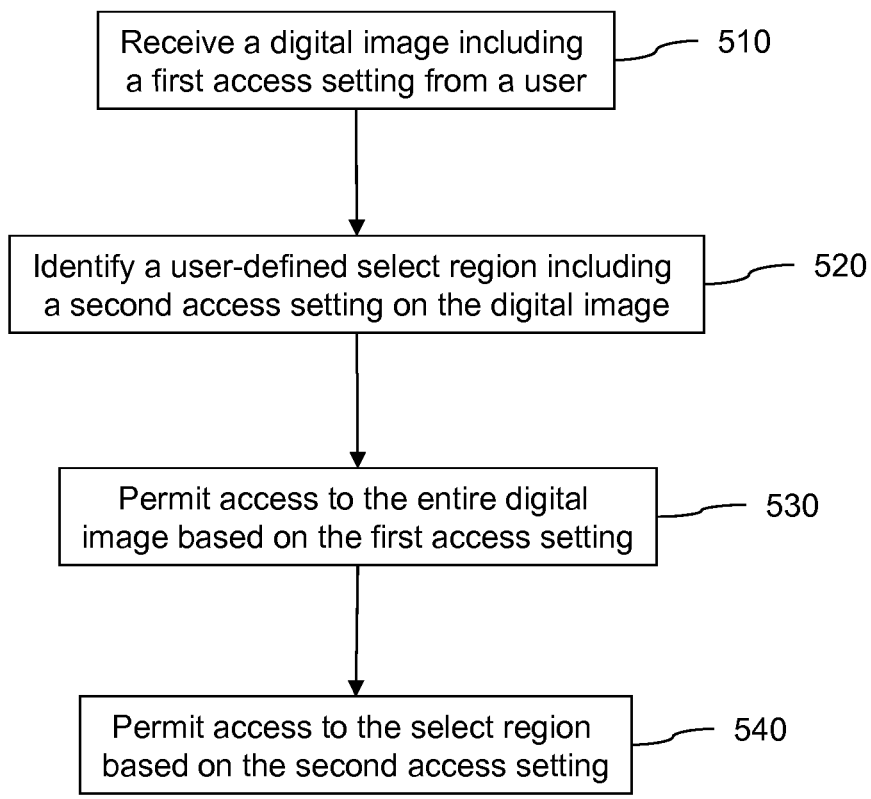
FIG. 5 is a flow diagram illustrating a method for sharing digital images on an image-sharing application according to an embodiment of the invention.

FIG. 5 is a flow diagram illustrating a method for sharing digital images on an image-sharing application according to an embodiment of the invention. As used herein, the term "image-sharing application" or "photo-sharing application" includes online services, websites, scripts, macros, servlets, applets, and other forms of programmatically executed instructions. A digital image is received from a user via a graphical user interface, wherein the digital image includes a first access setting defined by the user 510. As used herein, the term "user" includes an owner and/or operator of a profile or account on the image-sharing application (e.g., FLICKR.COM, MYSPACE.COM).

The first access setting defines individuals (or groups of individuals) who are permitted to view the entire digital image, and/or individuals (or groups of individuals) who are not permitted to view the entire digital image. In at least one embodiment, individuals can be defined by citing a group to which they belong and/or a required attribute that they must have. For example, in at least one embodiment, the digital image is uploaded onto the image-sharing application by the user, wherein the first access setting allows the digital image to be viewed only by the user. In another example, the first access setting allows the digital image to be viewed by all of the user's connections (e.g., "friends"). In yet another example, the first access setting does not allow the digital image to be viewed by the user's family members and/or co-workers.

A user-defined select region is identified on the digital image, wherein the select region includes a second access setting 520. In at least one embodiment of the invention, the select region is identified by a computer hardware processor (also referred to herein as the "processor") when the select region is cropped (click and drag an image box with a mouse) by the user. The second access setting defines individuals who are permitted to view the select region and/or individuals who are not permitted to view the select region. For example, in at least one embodiment, the second access setting allows the select region to be viewed by the public, all registered users of the image-sharing application, and/or the user's friends and "friends of friends". In another embodiment, the second access setting does not allow access to the select region by the user's work group (e.g., The XYZ Corporation) and/or the user's mom and dad.

An access controller permits access to the entire digital image based on the first access setting 530 and permits access to the select region based on the second access setting 540. For example, the access controller permits access to the select region by the public, and permits access to the entire digital image by the user's connections in New York, N.Y. In at least one embodiment of the invention, the access controller displays the digital image only to a first group of individuals based on the first access setting, and displays the select region only to a second group of individuals based on the second access setting.

In at least one embodiment, the access controller is a hardware device connected to the processor. As used herein, the term "connected" includes operationally connected, logically connected, in communication with, physically connected, engaged, coupled, contacts, linked, affixed, and attached.

In at least one embodiment, the access controller is a hardware device specifically programmed to: receive a request to access the digital image from an individual; compare the first access setting to the individual's profile; determine whether the individual's profile complies with the first access setting; permit the individual to access (e.g., view, download, copy) the digital image when the individual's profile complies with the first access setting; and, deny the individual to access to the digital image when the individual's profile does not comply with the first access setting. In addition, the access controller is specifically programmed to: receive a request to access the select region from an individual; compare the second access setting to the individual's profile; determine whether the individual's profile complies with the second access setting; permit the individual to access the select region when the individual's profile complies with the second access setting; and, deny the individual to access to the select region when the individual's profile does not comply with the second access setting.

Therefore, the access controller permits access to the select region to a second group of individuals based on the second access setting, and permits access to the digital image to a first group of individuals based on the first access setting. In at least one embodiment of the invention, the second group of individuals is larger than the first group of individuals. Therefore, the first access setting limits the number of viewers of the digital image with respect to the second access setting. In other words, more people can see the select region as compared to the number of people who can see the entire digital image. Everyone who has access to the entire digital image has access to the select region, but not everyone who has access to the select region has access to the entire digital image.

In another embodiment, however, more people are permitted access to the border content (i.e., the digital image without the select region) than the select region. In this embodiment, the select region is rendered black or blank to people who don't have access to the select region.

In at least one embodiment of the invention, at least one additional user-defined select region is identified on the digital image (e.g., by the processor), wherein the additional user-defined select region includes a third access setting. In at least one embodiment, the additional user-defined select region includes at least a portion of the select region (e.g., the second region 120 and/or third region 130). The third access setting defines individuals who are permitted to view the additional user-defined select region and/or individuals who are not permitted to view the additional user-defined select region. For example, the third access setting allows the digital image to be viewed by the user's "Close Friends" group and/or "softball team" group, which are defined by the user. In another embodiment, the third access setting does not allow access to the select region by the user's "acquaintances" group and/or "church" group, which are also defined by the user.

The access controller permits access to the additional user-defined select region based on the third access setting. In at least one embodiment, the third access setting limits the number of viewers of the digital image with respect to the second access setting, and the first access setting limits the number of viewers of the digital image with respect to the third access setting.

Figure 6:
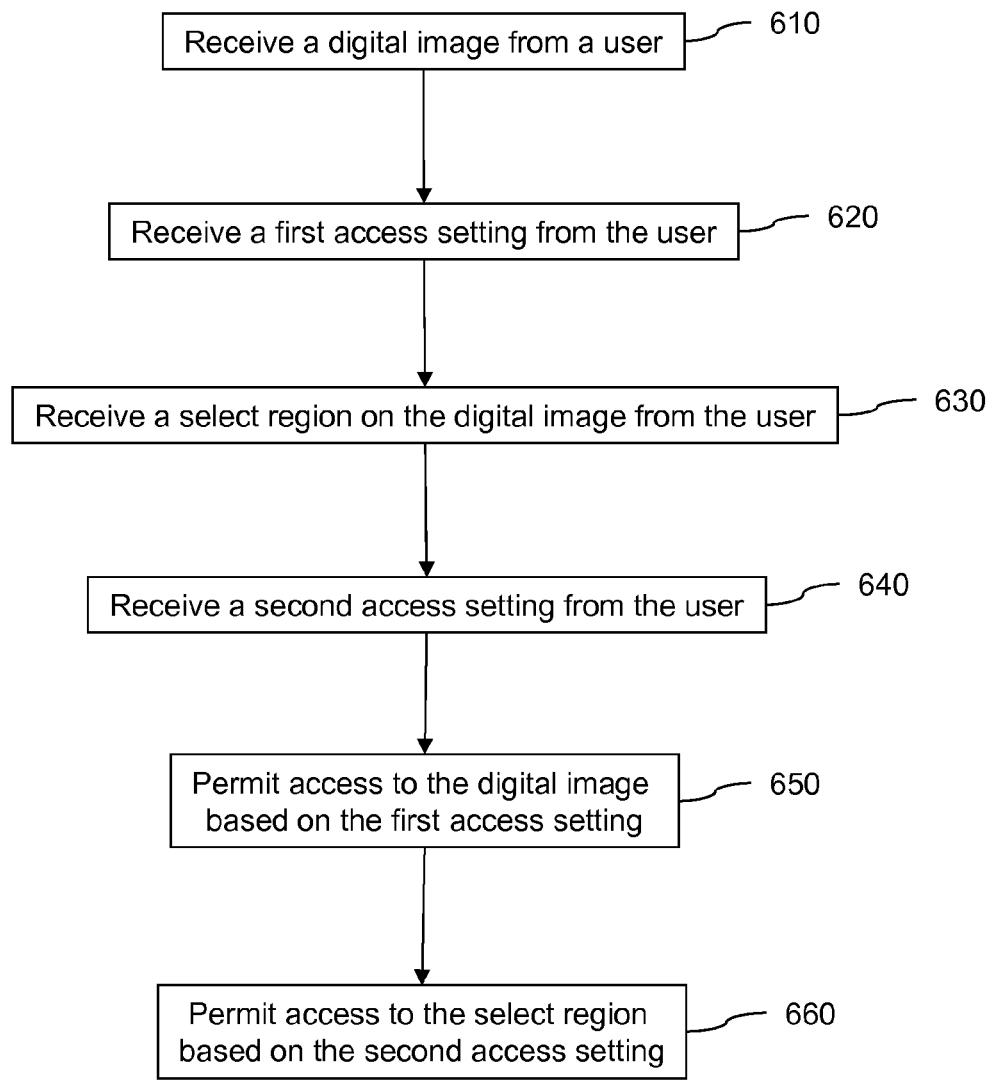
FIG. 6 is a flow diagram illustrating a method for sharing digital images on an image-sharing application according to another embodiment of the invention.

FIG. 6 is a flow diagram illustrating a method for sharing digital images on an image-sharing application according to an embodiment of the invention, wherein a digital image is received from a user 610 (e.g., via a graphical user interface). A first access setting is received from the user 620 (e.g., via the graphical user interface), wherein the first access setting includes individuals who are permitted to view the digital image and/or individuals who are not permitted to view the digital image.

A select region on the digital image is received from the user 630 (e.g., via the graphical user interface). In at least one embodiment, the select region is smaller than the digital image. A second access setting is also received from the user 640 (e.g., via the graphical user interface), wherein the second access setting includes individuals who are permitted to view the select region and/or individuals who are not permitted to view the select region. In at least one embodiment, the digital image, first access setting, select region, and second access setting are received by a communications module (e.g., within a processor) connected to the graphical user interface. Access to the digital image is permitted based on the first access setting 650; and, access to the select region is permitted based on the second access setting 660.

In at least one embodiment of the invention, access to the digital image and select region are permitted by an access controller connected to the processor. For example, the access controller permits access to the select region (e.g., the first region 110) to a second group of individuals (e.g., the user's location group (e.g., Washington, D.C.)) based on the second access setting; and, the access controller permits access to the digital photograph to a first group of individuals (e.g., the user's school group (e.g., State University)) based on the first access setting.

In at least one embodiment, the second group of individuals is larger than the first group of individuals. Thus, the number of individuals who are permitted to view the digital image is smaller than the number of individuals who are permitted to view the select region. In another embodiment, the first group of individuals is larger than the second group of individuals, wherein the select region is blocked or blurred to the second group of individuals.

In at least one embodiment of the invention, at least one additional select region on the digital image (e.g., the second region 120 and/or third region 130) and a third access setting are received from the user. In at least one embodiment, the additional select region includes at least a portion of the select region. Moreover, in at least one embodiment, the third access setting defines individuals who are permitted to view the additional select region and/or individuals who are not permitted to view the additional select region. In at least one embodiment of the invention, the additional select region and third access settings are received by the processor from the graphical user interface.

Access to the additional select region is permitted (e.g., by an access controller connected to the processor) based on the third access setting. In at least one embodiment, the number of individuals who are permitted to view the digital image is smaller than the number of individuals who are permitted to view the additional select region; and, the number of individuals who are permitted to view the additional select region is smaller than a number of individuals who are permitted to view the select region. In another embodiment, the number of individuals who are permitted to view the digital image is larger than the number of individuals who are permitted to view the additional select region (e.g., the additional select region is blocked out to certain individuals/groups); and, the number of individuals who are permitted to view the additional select region is larger than the number of individuals who are permitted to view the select region (e.g., the select region is blurred to certain individuals/groups).

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
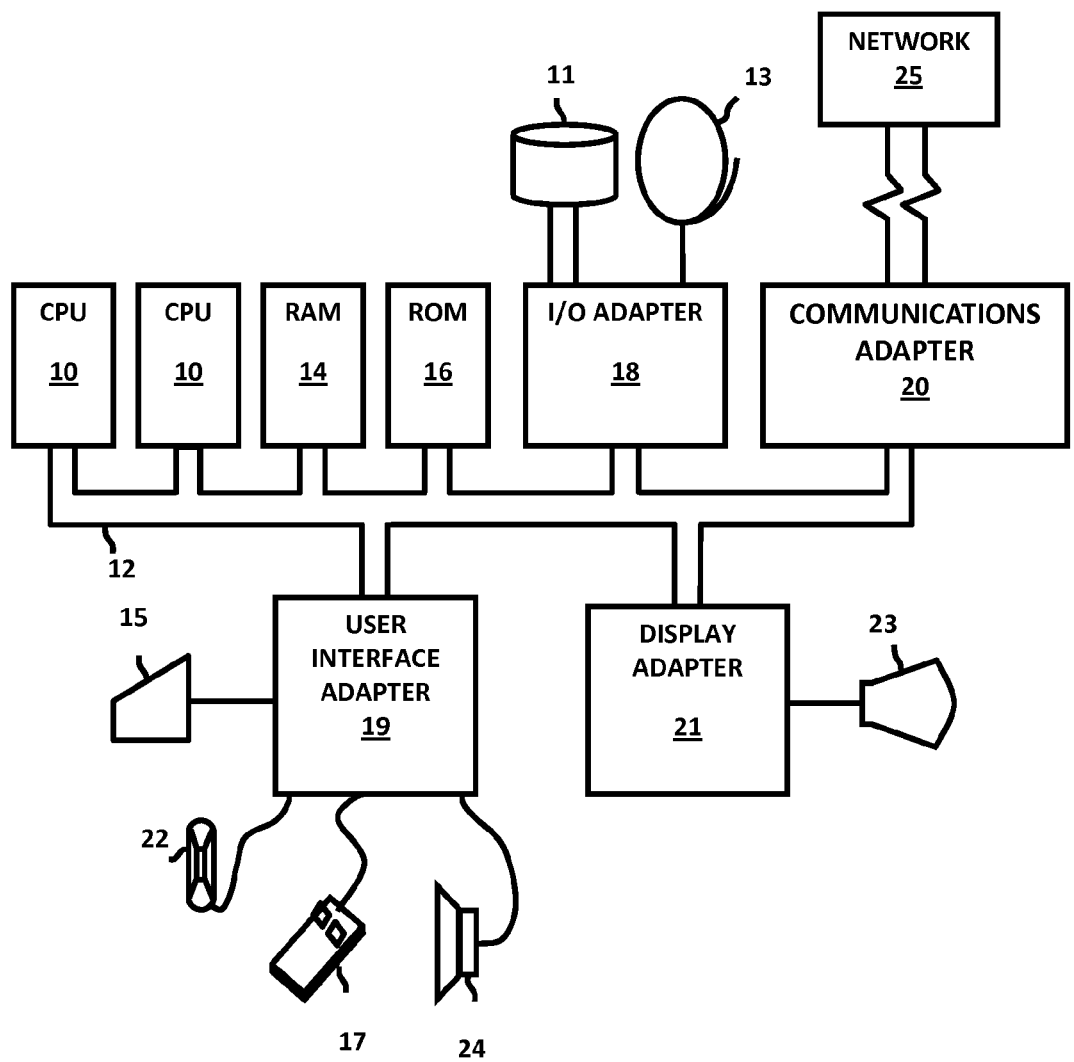
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for sharing digital images on an image-sharing application, said method comprising:

receiving a first input, the first input including a digital image;

receiving a second input from a user, the second input including a first access setting of the digital image;

receiving a third input from the user, the third input including a user-defined select region on the digital image;

receiving a fourth input from the user, the fourth input including a second access setting of the user-defined select region;

receiving at least one additional user-defined select region on the digital image from the user;

receiving a third access setting from the user;
identifying the user-defined select region on the digital image with a processor;
permitting access to the digital image with an access controller based on the first access setting;
permitting access to the user-defined select region with the access controller based on the second access setting; and
permitting access to the at least one additional user-defined select region based on the third access setting.

2. The method according to claim 1, wherein the first access setting defines at least one of:
   individuals who are permitted to view the digital image, and
   individuals who are not permitted to view the digital image, and
wherein the second access setting defines at least one of:
   individuals who are permitted to view the user-defined select region; and
   individuals who are not permitted to view the user-defined select region.

3. The method according to claim 2, wherein the first access setting limits the number of viewers with respect to the second access setting.

4. The method according to claim 1, further comprising:
identifying at least one additional user-defined select region on the digital image, the at least one additional user-defined select region including a third access setting; and
permitting access to the at least one additional user-defined select region based on the third access setting.

5. The method according to claim 4, wherein said third access setting defines at least one of:
   individuals who are permitted to view the at least one additional user-defined select region; and
   individuals who are not permitted to view the at least one additional user-defined select region.

6. The method according to claim 4, wherein the third access setting limits the number of viewers with respect to the second access setting, and
   wherein the first access setting limits the number of viewers with respect to the third access setting.

7. The method according to claim 4, wherein said permitting access to the digital image includes blocking at least one of the user-defined select region and the additional user-defined select region.

8. The method according to claim 4, and wherein said permitting access to the additional user-defined select region includes blocking the user-defined select region.

9. A method for sharing digital photographs on a photo-sharing web application, said method comprising:
   receiving a first input, the first input including a digital photograph;
   receiving a second input from a user, the second input including a first access setting of the digital photograph;
   receiving a third input from the user, the third input including a user-defined select region on the digital photograph;
   receiving a fourth input from the user after receiving said third input from the user, the fourth input including a second access setting of the user-defined select region;
   receiving at least one additional user-defined select region on the digital image from the user;
   receiving a third access setting from the user;
   identifying the user-defined select region on the digital photograph with a processor, wherein the user-defined select region is smaller than the digital photograph;
   permitting access to the user-defined select region to a second group of individuals with an access controller connected to the processor, the access to the user-defined select region being based on the second access setting;
   permitting access to the digital photograph to a first group of individuals with the access controller, the access to the digital photograph being based on the first access setting, wherein the second group of individuals is larger than the first group of individuals; and
   permitting access to the at least one additional user-defined select region based on the third access setting.

10. A method for sharing digital images on an image-sharing application, said method comprising:
    receiving a first input, the first input including a digital image;
    receiving a second input from a user, the second input including a first access setting, the first access setting including at least one of:
       individuals who are permitted to view the digital image, and
       individuals who are not permitted to view the digital image;
    receiving a third input from the user, the third input defines a user-defined select region on the digital image;
    receiving a fourth input from the user, the fourth input including a second access setting, the second access setting including at least one of:
       individuals who are permitted to view the user-defined select region, and
       individuals who are not permitted to view the user-defined select region;
    receiving at least one additional user-defined select region on the digital image from the user;
    receiving a third access setting from the user;
    permitting access to the digital image with an access controller based on the first access setting;
    permitting access to the user-defined select region with the access controller based on the second access setting; and
    permitting access to the at least one additional user-defined select region based on the third access setting.

11. The method according to claim 10, wherein a number of individuals who are permitted to view the digital image is smaller than a number of individuals who are permitted to view the user-defined select region.

12. The method according to claim 10, wherein said third access setting defines at least one of:
    individuals who are permitted to view the at least one additional user-defined select region; and
    individuals who are not permitted to view the at least one additional user-defined select region.

13. The method according to claim 10, wherein a number of individuals who are permitted to view the digital image is smaller than a number of individuals who are permitted to view the at least one additional user-defined select region; and
    wherein a number of individuals who are permitted to view the at least one additional user-defined select region is smaller than a number of individuals who are permitted to view the user-defined select region.

14. The method according to claim 10, wherein said permitting access to the digital image includes blocking at least one of the user-defined select region and the additional user-defined select region.

15. The method according to claim 10, and wherein said permitting access to the additional user-defined select region includes blocking the user-defined select region.

16. The method according to claim 10, wherein the user inputs the third input by cropping the user-defined select region with an interface, said cropping including positioning four corners of the user-defined region on the digital image.

17. The method according to claim 16, wherein the user-defined select region is positioned in a non-centric manner on the digital image.

18. The method according to claim 10, wherein the fourth input from the user is received prior to the third input from the user.

19. A method for sharing digital images on an image-sharing application, said method comprising:
receiving a first input, the first input including a digital image;
receiving a second input from a user, the second input including a first access setting of the digital image;
receiving a third input from the user, the third input including a user-defined select region on the digital image;
receiving a fourth input from the user, the fourth input including a second access setting of the user-defined select region;
receiving at least one additional user-defined select region on the digital image from the user;
receiving a third access setting from the user;
identifying the user-defined select region on the digital image with a processor;
displaying the digital image only to a first group of individuals based on the first access setting;
displaying the user-defined select region only to a second group of individuals based on the second access setting; and
permitting access to the at least one additional user-defined select region based on the third access setting.

20. The method according to claim 19, further comprising:
identifying at least one additional user-defined select region on the digital image, the at least one additional user-defined select region including a third access setting; and
displaying the at least one additional user-defined select region only to a third group of individuals based on the third access setting.

21. The method according to claim 20, wherein the third access setting limits the number of viewers with respect to the second access setting, and wherein the first access setting limits the number of viewers with respect to the second access setting and the third access setting.

22. The method according to claim 20, wherein said displaying of the digital image includes blocking at least one of the user-defined select region and the additional user-defined select region.

23. The method according to claim 20, and wherein said displaying of the additional user-defined select region includes blocking the user-defined select region.

24. A method for sharing digital images on an image-sharing application, said method comprising:
receiving a first input, the first input including a digital image;
receiving a second input from a user, the second input including a first access setting, the first access setting including:
individuals who are permitted to view the digital image, and
individuals who are not permitted to view the digital image;
receiving a third input from the user, the third input including a user-defined select region on the digital image;
receiving a fourth input from the user, the fourth input including a second access setting, the second access setting including:
individuals who are permitted to view the user-defined select region, and
individuals who are not permitted to view the user-defined select region;
receiving at least one additional user-defined select region on the digital image from the user;
receiving a third access setting from the user;
permitting access to the digital image with an access controller based on the first access setting;
permitting access to the user-defined select region with the access controller based on the second access setting; and
permitting access to the at least one additional user-defined select region based on the third access setting.

* * * * *